United States Patent [19]

Schlösser

[11] Patent Number: 4,623,993

[45] Date of Patent: Nov. 18, 1986

[54] REDUCING LISTENERS DISCOMFORT RESULTING FROM TRACK LOSS IN COMPACT DISC PLAYERS

[75] Inventor: Theodoor A. J. Schlösser, Eindhoven, Netherlands

[73] Assignee: U.S. Philips Corporation, New York, N.Y.

[21] Appl. No.: 577,429

[22] Filed: Feb. 6, 1984

[30] Foreign Application Priority Data

Oct. 17, 1983 [NL] Netherlands .......................... 8303565

[51] Int. Cl.4 ............................................... G11B 7/00
[52] U.S. Cl. .......................................... 369/33; 369/44
[58] Field of Search .................... 358/342; 369/32, 33, 369/43–46

[56] References Cited

U.S. PATENT DOCUMENTS 4,496,993  1/1985  Sugiyama et al. ................ 369/30 X
4,516,231  5/1985  Michaelis .......................... 369/43 X Primary Examiner—Robert L. Richardson
Attorney, Agent, or Firm—Thomas A. Briody; William J. Streeter; Marianne R. Rich

[57] ABSTRACT

Following a loss of track, the laser beam in a compact disc audio player is returned to the position at track loss by a "go-to" control signal signifying the number of tracks between the end position after track loss and the position at track loss. Preferably, an incremental position is added to the track loss position so that the beam is returned to the position it would have reached had no track loss occurred.

8 Claims, 1 Drawing Figure

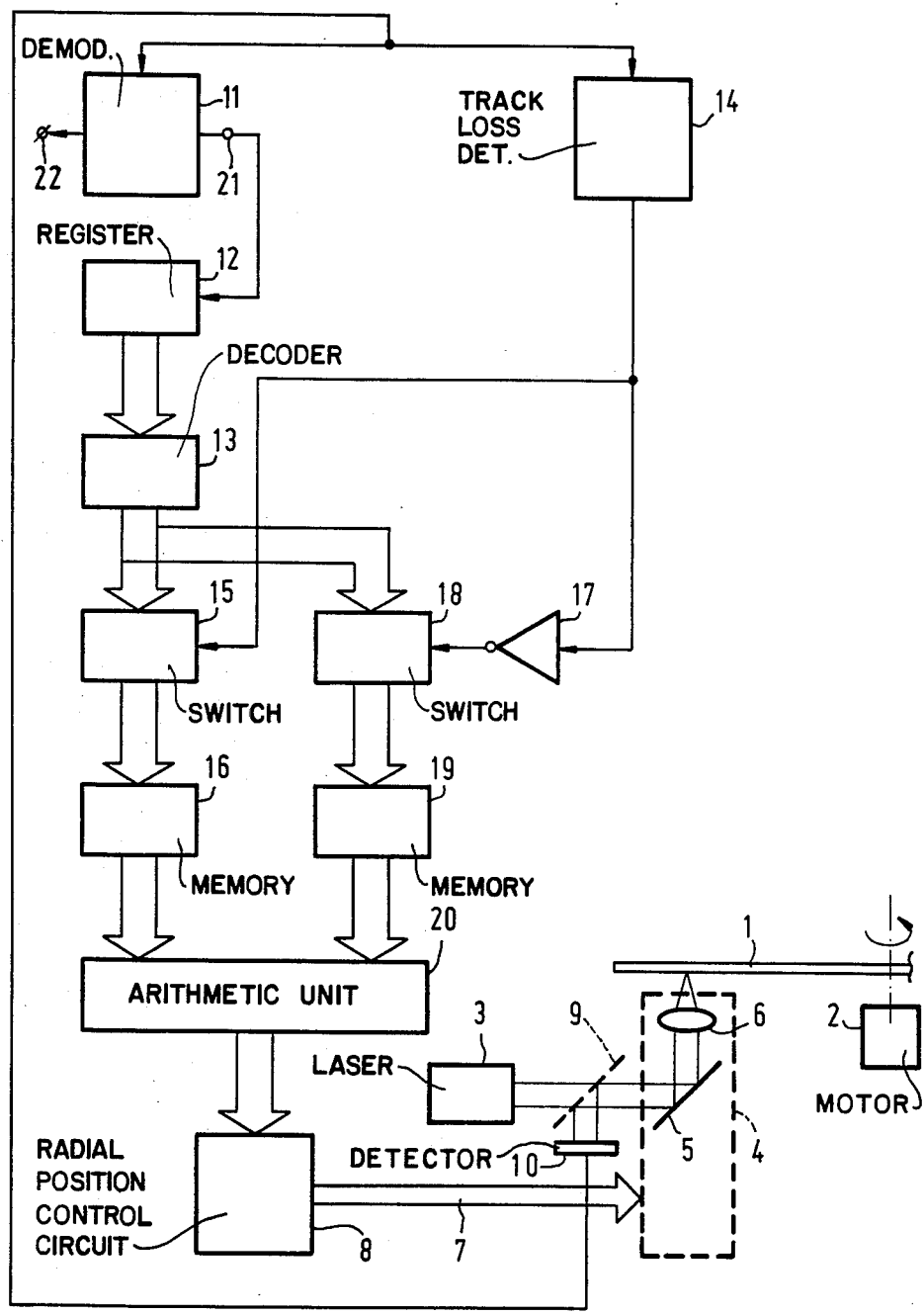

REDUCING LISTENERS DISCOMFORT RESULTING FROM TRACK LOSS IN COMPACT DISC PLAYERS

BACKGROUND OF THE INVENTION

1. Field of the Invention

The invention relates to apparatus for reproducing information contained in tracks on a disc-shaped optically readable record carrier, and, more particularly, control of such apparatus following track loss.

2. Description of the Prior Art

In known compact disc players, the information on the tracks includes a position code which is a continuous indication of the radial position on said record carrier. The known apparatus comprises
an optical system for projecting a light beam on the record carrier,
a detector arranged in the light beam which has been modulated by the information structure on the record carrier, for supplying a signal which is modulated by the information recorded on the record carrier,
a radial-position control circuit for controlling the radial position of the spot formed on the record carrier by the light beam,
a position-code detector for extracting said position code from the detected signal,
a track-loss detector circuit for generating a signal which is indicative of the condition that the spot formed by the light beam no longer follows the track.

Such an apparatus is commercially available in many versions as a "compact-disc-digital-audio" player, for example the player with the type number CD 100 from N. V. Philips' Gloeilampenfabrieken, as described in Philips Technical Review, Vol. 40, 1982, no. 6.

Such a player is suitable for use in motor cars, but the susceptibility to mechanical shocks and electrical disturbances in the supply voltage then poses a problem because this may give rise to loss of track.

SUMMARY OF THE INVENTION

It is the object of the invention to provide an apparatus of the type specified in the opening paragraph, which mitigates the adverse effects of a loss of track, and to this end the apparatus is characterized comprises a storage circuit for storing last time code data read at
an instant immediately prior to loss of track, and
means for applying a start-position code which is determined only in part by said last time code data to the radial-position control circuit for restarting the reproduction at a position which is defined by said start-position code.

This step ensures that the disturbance only gives rise to a brief signal dropout without a jump to an arbitrary other music passage.

In order to preclude "stalling" of the reproduction as a result of a position-dependent error, the apparatus in accordance with the invention may be further characterized in that the means for applying the start-position code generate a start-position code which signifies a position reached after a specific time interval following the position signified by the stored position code.

In a preferred embodiment of an apparatus in accordance with the invention the means for applying the start-position code generate a start-position code which follows the stored position code after a time interval which corresponds to the time taken by the loss of track and the restoration of normal reproduction.

In this embodiment the rhythm of the music being reproduced is hardly disturbed and losing track has the same effect as a brief signal dropout.

This preferred embodiment may be further characterized in that there is provided a second storage circuit for storing a position code read upon locking in to another position on the record carrier after a loss of track and the means for applying the start-position code comprise a circuit for determining the interval between the start-position code to be generated and the position code stored in the first storage circuit as a function of the difference between the position codes stored in the two storage circuits.

In practice, the position code mentioned in the foregoing will generally be a time code indicating the elapsed time of the piece of music on the entire disc.

An embodiment of the invention will be described in more detail, by way of example, with reference to the drawing, which shows an apparatus in accordance with the invention.

BRIEF DESCRIPTION OF THE DRAWING

The sole FIGURE is a schematic block diagram of the apparatus of the present invention.

DESCRIPTION OF THE PREFERRED EMBODIMENTS

A laser beam produced by a laser 3 is focussed on the disc 1 via a radially controllable optical system 4, in the present example a mirror 5 and a lens system 6. The radical position of the spot where said laser beam is incident can be controlled, which is symbolically represented by an arrow 7 between a radial-position control circuit 8 and the optical system 4. The laser light reflected by the disc 1 is projected on a detector 10 by means of semitransparent mirror 9. The detector 10 supplies a signal which depends on the reflected beam to a demodulation circuit 11, which supplies a demodulated signal to an output 21. On the output 21, C and D bits (control and data bits) appear which contain a time code which is a measure of the instantaneous position of the spot formed by the laser beam. This time code may be derived from the signal on output 21, inter alia by loading said signal to a register 12 and decoding it by means of a decoder circuit 13, on whose output the last time code decoded is available.

The output signal of the detector 10 is also applied to a track-loss detector 14, which supplies an output signal (loss of track signal) when the spot formed by the laser beam no longer follows the data track on the disc in a correct manner.

In order to minimize the disturbance in the event of a loss of track a switch 15 is controlled by said track-loss detector 14 to transfer the state of the decoder circuit 13 to a memory 16 which stores the last time code data read before losing track. This time code may be applied to a radial-position circuit 8 in the form of "go-to" command, after which the optical system 4 is controlled so as to direct the spot of the laser beam to a position on or near the track in which the loss of track occurred. However, a better correction is obtained by going to a position which would have been reached in the case of an undisturbed read-out of the disc.

In the case of a loss of track the radial-tracking mechanism ensures that the beam locks in to a new track reached by the spot of the beam after losing track. After locking-in a time code is read out, which under control of the inverted output signal of the track-loss detector 14 which signal is inverted by means of the inverter 17, is read into a memory 19 via a switch 18. By means of an arithmetic circuit 20 the time code of the "go-to" position is determined, for example by determining the difference, determining the time required for positioning by means of a search table, and adding this (herein referred to as incremental position data) to the time code in the memory 16, the resulting signal being applied to the radial-position control circuit 18 as a "go-to" command. This precludes "stalling" of the reproduction, which may happen when going back to the track-loss position if this track-loss is not accidental (such as a shock) but is position-dependent. Moreover, going back to a position which would have been reached in the case of undisturbed music reproduction (herein referred to as a desired position), has the advantage that the rhythm of this music is not disturbed.

The demodulating circuit 11, the track-loss detector 14 and the position-control circuit 18 which responds to a "go-to" command are circuits known to those skilled in the art and they are used in players of the "compact-disc-digital-audio" type which are commercially available from various companies, so that these circuits need not be described in detail.

It is to be noted that in the present example the apparatus in accordance with the invention is represented as a discrete circuit. The microprocessor used in "compact-disc-digital-audio" players, however, is particularly suitable for performing most circuit functions. For example, the functions of the parts 12, 13, 15, 16, 17, 18, 19, 20 can be readily programmed in the microprocessor.

In the present apparatus the switch for sound-muting during a track-loss condition is not shown. When the invention is used this sound-muting is prefereably sustained until the correct track position is found, so that no sound is reproduced until after the first lock-in following a track-loss. This can be achieved simply by making use of logic switching means.

Instead of the use of the time code as position code, it is of course possible to use any other code which is representative of the position on the disc.

What is claimed is:

1. In apparatus having means for directing a beam onto disc-shaped record carrier means having tracks, for reading information stored on said tracks, said information comprising time code data indicative of the radial position of said beam on said record carrier means, said apparatus further having radial position control circuit means for controlling said radial position of said beam in accordance with go-to position signals applied to said control circuit means, the improvement comprising:
    means for detecting loss of track of said beam and generating last time code data indicative of said radial position of said beam at said loss of track;
    storage means for storing said last time code data; and means connected to said storage means and said radial position control circuit means for generating go-to position signals determined only in part by said last time code data and applying said go-to position signals to said radial position control circuit means.

2. Apparatus as claimed in claim 1, further comprising means for furnishing determined time interval data and adding said determined time interval data to said last time code data.

3. Apparatus as claimed in claim 1, further comprising memory means;
    wherein said apparatus further comprises means for positioning said beam in an end of jump track having end of jump time code data associated therewith following said loss of track;
    and wherein said determined time interval data corresponds to the difference between said end of jump time code data and said last time code data.

4. Apparatus for reproducing information stored in tracks on a disc shaped optically readable record carrier, said information comprising actual position code data indicative of the then-present radial position of a beam on said record carrier means, comprising
    means for directing a beam onto said record carrier means, thereby modulating said light beam with said information;
    detector means arranged in the path of said light beam for generating information-modulated signals corresponding to said information contained in said tracks and for extracting said actual position code data therefrom;
    radial position control circuit means for controlling said radial position of said beam in accordance with "go-to" position signals applied thereto;
    track loss detection means for detecting loss of track of said beam and for generating a track loss signal indicative thereof;
    storage means;
    switch means responsive to said loss of track signal and connected to said detector means and said storage means for entering last position code data signifying said position code data at said track loss into said storage means; and
    means connected to said storage means and said radial position control means for generating a go-to signal depending at least in part on said last position code data, and applying said go-to signal to said radial position control circuit means, whereby said radial position control means moves said beam back towards said radial position of said beam at said loss of track.

5. Apparatus as claimed in claim 4, further comprising means for adding incremental position code data to said last position code data thereby creating desired position code data; and
    wherein said "go-to" position signal generating and applying means generates said "go-to" position signals in dependence upon said desired position code data.

6. Apparatus as claimed in claim 4, further comprising means for positioning said beam in an end-of-jump track having end of jump position code data associated therewith following said loss of track;
    wherein said detector means further extracts said end-of-jump position code data from said information-modulated signals;
    further comprising memory means coupled to said detector means for receiving and storing said end-of-jump position code data.

7. Apparatus as claimed in claim 6, further comprising
    means connected to said memory means and said storage means for generating incremental position data varying in accordance with the difference between said end of jump position code data and said last position code data and adding said incremental position data to said last position code data, thereby creating desired position code data;

and wherein said "go-to" position signal generating and applying means generate said "go-to" position signals in dependence on said desired position code data.

8. Apparatus as claimed in claim 7, wherein said track loss and movement back requires a time interval varying with said difference between said end of jump and last position code data;

and wherein said incremental position data corresponds to the position said beam would have reached during said time interval in the absence of said track loss.

* * * * *